United States Patent
Weigand

(10) Patent No.: US 7,178,634 B2
(45) Date of Patent: Feb. 20, 2007

(54) DEVICE FOR SUPPLYING LUBRICANT TO SEVERAL LUBRICATION POINTS ON MACHINE PARTS

(75) Inventor: Michael Weigand, Elfershausen (DE)

(73) Assignee: perma-tec GmbH & Co. KG, Euerdorf (DE)

(*) Notice: Subject to any disclaimer, the term of this patent is extended or adjusted under 35 U.S.C. 154(b) by 581 days.

(21) Appl. No.: 10/705,653

(22) Filed: Nov. 10, 2003

(65) Prior Publication Data
US 2004/0129500 A1 Jul. 8, 2004

(30) Foreign Application Priority Data
Nov. 9, 2002 (DE) .............................. 202 17 308

(51) Int. Cl.
*F01M 11/04* (2006.01)
(52) U.S. Cl. .................... 184/105.1; 184/81; 184/31; 184/33
(58) Field of Classification Search ............. 184/105.1, 184/31, 33, 81
See application file for complete search history.

(56) References Cited

U.S. PATENT DOCUMENTS 4,291,724 A * 9/1981 Miller ......................... 137/555
6,358,174 B1 * 3/2002 Folsom et al. ................. 475/72
6,571,918 B1 * 6/2003 Cotler ......................... 184/7.4
6,988,590 B1 * 1/2006 Knight ....................... 184/27.1

FOREIGN PATENT DOCUMENTS

DE  298 15 971  3/1999

* cited by examiner

Primary Examiner—David Fenstermacher
(74) Attorney, Agent, or Firm—Collard & Roe, P.C.

(57) ABSTRACT

A device for supplying several lubrication points on machine parts with a lubricant, comprising an electromechanical lubrication dispenser and a distribution device coupled to a lubricant outlet of the dispenser. The distribution device has a housing, a cylindrical hollow distributor body or tube which is mounted to rotate about a vertical axis. There is also a fixed cylindrical sleeve that surrounds the distributor body, forming a seal. The distributor body has an opening at the top for allowing the lubricant in, and has at least two distributor bores disposed on the circumference but offset axially from one another. Each of these distributor bores has a corresponding opening bore in the distributor sleeve that is assigned to it. This distribution device also has an electric motor drive that has a running path control that has a switch that functions electromechanically or in a contact free manner. This drive has a switch that stops the rotational movement in different release angle positions that can be variably established.

7 Claims, 3 Drawing Sheets

DEVICE FOR SUPPLYING LUBRICANT TO SEVERAL LUBRICATION POINTS ON MACHINE PARTS

CROSS REFERENCE TO RELATED APPLICATIONS

This Application hereby claims priority under 35 U.S.C. 119 from German Patent Application Serial no. 202 17 308.9 filed on Nov. 9, 2002.

BACKGROUND OF THE INVENTION

The invention relates to a device for supplying lubricant to several lubrication points on machine parts. This device comprises an electro-mechanical lubricant dispenser having an electric control which is used to control a distribution device. The distribution device is connected to a lubricant outlet of the lubricant dispenser and comprises a housing, a cylindrical hollow distributor body or tube mounted to rotate about a vertical axis, and a fixed cylindrical distributor sleeve that surrounds the distributor body forming a seal.

In this case, the distributor body or distribution tube which has an opening at the top for allowing lubricant in, has at least two distributor bores on the circumference, offset axially form one another. Each of these bores has an opening bore in the distributor sleeve assigned to it, wherein each distributor bore has a release angle position of the distributor body assigned to it. Once the distributor bore of the distributor body aligns with the bore of the sleeve, it uncovers an opening bore for the discharge of the lubricant.

A device of this type and having these characteristics is shown by German Reference DE 29815971 U1. In this device, the lubricant dispenser has an electric motor drive which transports lubricant and at the same time drives the distributor body to rotate. During this dispensing process, this distributor body performs a slow continuous rotational movement. However, since the coverage of the distributor bores by the opening bores changes in this design, pressure variations occur, which have a detrimental effect on the accuracy with which the lubricant is dispensed. In addition, in this arrangement, it is not possible to vary the number of lubrication points during this operation.

Thus, the invention is based upon creating a device which guarantees a flexible and precise lubricant supply to different lubrication points associated with the device.

SUMMARY OF THE INVENTION

The task of the invention is accomplished by creating a device that relates to a distribution device that has an electric motor drive for changing the angle position of the distributor body. This electric motor can be controlled by the electronic control of the lubricant dispenser. In this design, the electric motor drive has a running path control that has a switch that functions electro-mechanically or in a contact free manner. The electric motor drive stops the rotational movement of the distributor body in different release angle positions that can be variably established. Thus, this design allows the flexible and at certain times, a precise supply of lubricant to different lubrication points. This is because the rotational movement of the distributor body is completely separated or uncoupled from the lubricant releases of the lubricant dispenser via this separate motor drive.

In addition, there are also preferably a plurality of position pins which are releasably attached to the distributor body. These position pins are associated with different release angle positions and interact with the associated switch. Thus, this design allows for an electro-mechanical detection of the release angle positions.

However, in another embodiment of the invention these position pins can be in the form of indicators that are contact free, such as inductive approximation switches, light sensitive sensors, etc.

The electronic control of the lubricant dispenser sends an electronic control signal to the electronic motor drive of the distribution device. This signal triggers the rotational movement of the distributor body after a predetermined lubricant amount has been dispensed. The electronic control sets this predetermined amount before dispensing. In addition, this rotational movement is before the lubricant dispenser receives a new dispensing pulse from the electronic control.

This design has the advantage that the lubricant release and the rotational movement of the distributor body do not occur simultaneously, but rather occur sequentially, one after the other. The release of this lubricant therefore occurs only if one of the distributor bores aligns with the opening bore assigned to it, and thereby uncovers this opening bore completely.

Therefore, during the release of the lubricant, there is no partial alignment between the two bores, they are instead completely aligned, which would bring about a clear increase in pressure loss in the distribution device. Thus, with this design, the amount of lubricant to be released can be very precisely metered.

This distribution device can have a device for recognizing the exact release angle position, which gives off different signals assigned to the release angle positions. A first type device for determining the release angle position can be in the form of the position pins with a corresponding mechanical sensor that is triggered when it is contacted by the position pins. Another type device for determining a release angle position can be in the form of a coding wherein this coding is a non-contact form with a corresponding sensor. The sensor sends a unique signal value back to the electronic control of the lubricant dispenser. In this way, the electronic control of the lubricant dispenser recognizes what release angle position is present at all times. In addition this electronic motor drive can have a device for the detection of the angle of rotation that refers back to the reference value for the angle of rotation wherein the measurement values can be passed to the electronic control of the lubricant dispenser for further signal processing. Thus, with both the electric motor drive and the sensor system working together, the electric control can consistently monitor the angle of rotation of the distribution device.

These opening bores can be aligned in a row on a vertical axis, or arranged at offset angles from one another. In addition, these opening bores can have a connection for a lubricant line to supply a lubrication point, in each instance, on its discharge side.

BRIEF DESCRIPTION OF THE DRAWINGS

Other objects and features of the present invention will become apparent from the following detailed description considered in connection with the accompanying drawings which discloses at least one embodiment of the present invention. It should be understood, however, that the drawing is designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
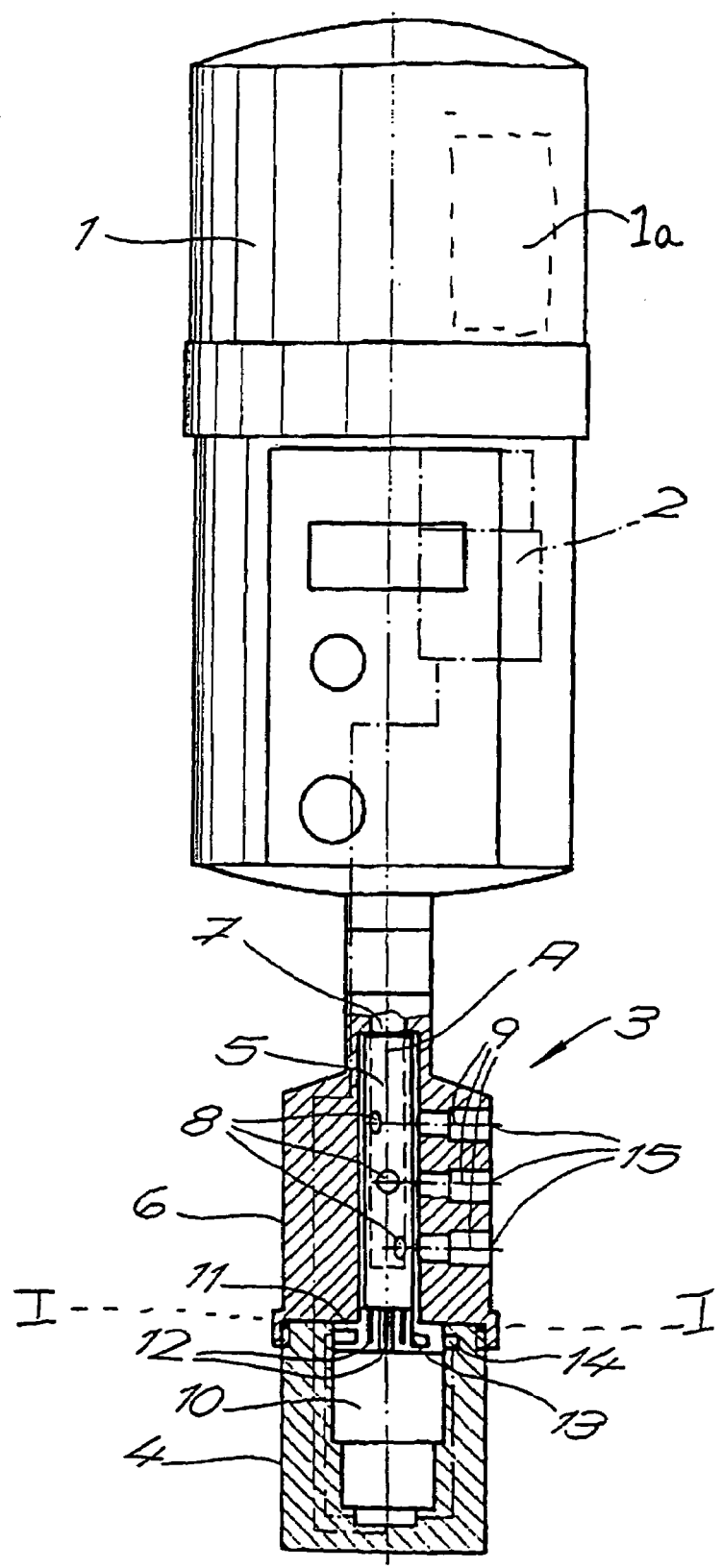
FIG. 1 is a side cross-sectional view of a first embodiment of the invention.

Turning now in detail to the drawings, FIG. 1 is a side cross-sectional view of a first embodiment of the invention. In this device, there is a device for supplying several lubrication points on machine parts with lubricant. This device comprises an electromechanical lubricant dispenser 1 having a pump 1a for pumping the lubricant, an electrical control 2 for controlling the pumping of the lubricant and a distribution device 3 connected to a lubricant outlet of lubricant dispenser 1. Distribution device 3 has a housing 4, a cylindrical hollow distributor body or distribution tube 5 that is mounted to rotate about a vertical axis A. There is also a fixed cylindrical distributor sleeve 6 that surrounds distributor body 5 forming a seal. Distributor body 5 has an opening 7 at the top, for letting in the dispensed lubricant. Body or tube 5 has a plurality of distributor bores 8 on its circumference, which are offset axially relative to one another.

Each distributor bore 8 has a corresponding opening bore 9 disposed in distributor sleeve 6 assigned to it. In addition, each distributor bore 8 has a corresponding release angle position of distributor body 5 assigned to it. Thus, in this way, electric control 2 will always be able to track the alignment of each bore 8. In this case, each distributor bore 8 can align with a corresponding opening bore 9 assigned to it, and uncover this corresponding opening bore 9 assigned to it.

In the present example, distributor bores 8 and opening bores 9 are arranged so that only one opening bore 9 is uncovered at one time for the discharge of lubricant in each release angle position of distributor body 5. Distribution device 3, has an electric motor drive to change its angle position of distributor body 5 which can be controlled by electric or electronic control 2 of lubricant dispenser 1.

Coupled to distribution tube 5 is an electric motor drive which is used to turn distribution tube 5 around an axis A. Electric motor drive 10 has a running path control which has a switch 11 that functions electro-mechanically and stops the rotational movement of distributor body 5 in different release angle positions that can be variably established. Drive 10 acts separately from pumping action of pump 1a to keep the rotational movement of distributor body 5 from lubricant discharges of lubricant dispenser 1. This separate drive makes it possible to have a flexible and extremely precise lubricant supply to the lubrication points at machine parts that are connected with the device. In FIG. 1 the device has an autarchic power supply by means of batteries which are not shown.

Figure 2:
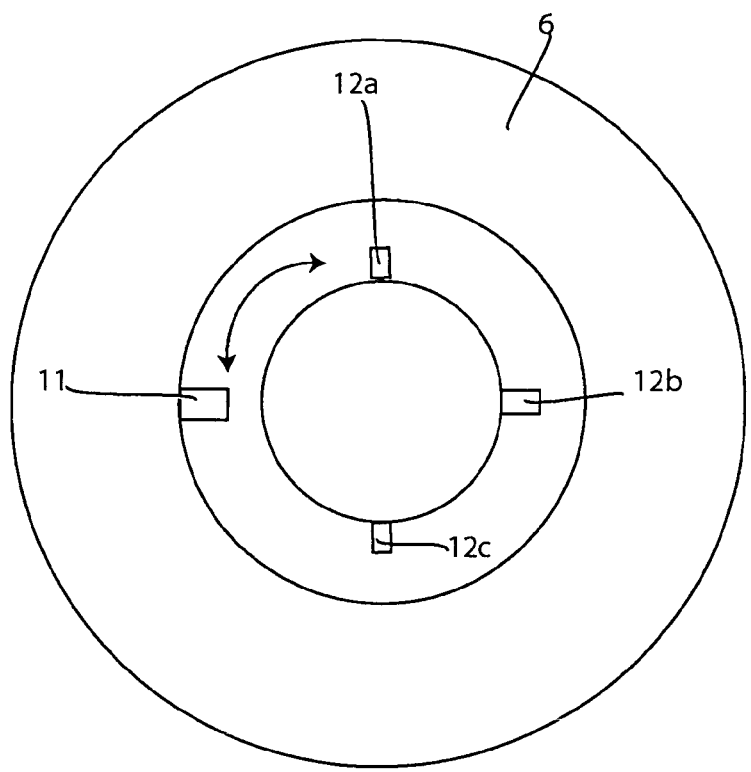
FIG. 2 is a bottom view of one embodiment of the sensor system.
Figure 3:
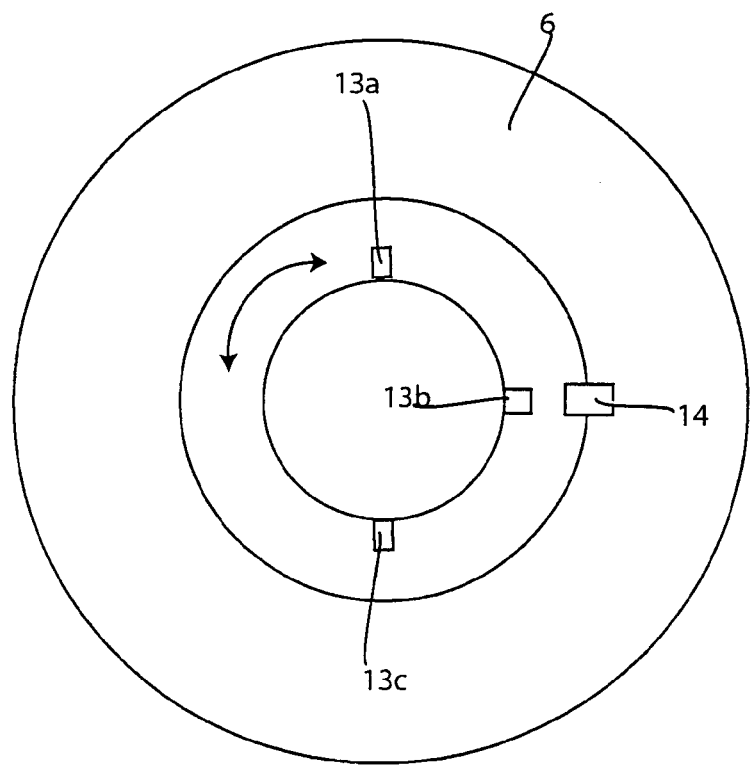
FIG. 3 is a bottom view of another embodiment of the sensor system.

There are a plurality of position pins 12 which are releasably attached to distributor body 5, and which are assigned to different release angle positions as different switch elements to interact with switch 11. This type of design is shown in FIG. 2. Another type of embodiment is shown in FIG. 3 wherein there is a contact free type design.

In operation, electric motor drive 10 of distribution device 3 receives a control pulse from electronic control 2 that triggers the rotational movement of distributor body 5. This occurs after a lubricant amount that has been predetermined by electronic control 2 has been discharged, and before lubricant dispenser 2 receives a new dispensing pulse from electronic control 2. Thus, the lubricant releases of lubricant dispenser 1 and the rotational movement of distributor body 5 are separated from one another in terms of time.

Thus, a discharge of lubricant occurs when the desired distributor bore 8 aligns with opening bore 9 assigned to it and aligns and uncovers opening bore 9 for the release of lubricant. With this design, a partial overlap of the two openings 8 and 9 is avoided and then the amount of the lubricant that is discharged can be adjusted very precisely.

Distributor body 5 also has a coding 13 that defines a reference value for the angle of rotation. This coding is represented in the form of a coding pin. A sensor 14 is disposed in housing 4 wherein this sensor 14 is used to detect coding 13, the signal value of which is passed to electronic control 2 of lubricant dispenser 1. Thus, with this design, electronic control 2 of lubricant dispenser 1 always recognizes which release angle is present.

Opening bores 9 are aligned in a row on a vertical axis A, and each have a connection 15 for a lubricant line to supply a lubrication position on the discharge side. While In one embodiment as shown in FIG. 1 both the switch 11, pins 12, coding 13, and sensor 14 are disposed in the device. However, other embodiments can include either just the switch 11, and pins 12, (See FIG. 2) or just coding 13 and sensor 14 (See FIG. 3).

For example, FIG. 2 is a cross-sectional view taken along line I—I of an embodiment of switch 11 and pins 12 which relates to a electromechanical indication system for indicating the rotation angle of distributor body 5. This view shows that when distributor 5 rotates, pin 12 contacts switch 11 during the rotation to indicate electric controller 2 that a particular angular position has been achieved. Each of these pins 12 is associated with a particular hole 8 for indicating when that particular hole or bore 8 lines up with a corresponding hole or bore 9 in sleeve 6. Distributor 5 can rotate so that as after a first pin 12a contacts switch 11 it can distribute the lubricant associated with a first hole 8 and then, when given instructions rotate until a second pin 12b contacts switch 11 to distribute lubricant out of a second hole. Thus pins 12a, 12b and 12c can all be used as indicators for an axial position of distributor 5.

Alternatively, FIG. 3 shows a cross-sectional view of the design including coding 13 and sensor 14. This design functions as described above with each of the coding pins 13a, 13b and 13c indicating a different angular position that can be sent to electric control 2. However, this design differs from that shown in FIG. 2 wherein this design does not function based upon the contact between pins 12 and switch 11. Rather this design is a non-contact design wherein sensor 14 can detect the presence of an adjacent coding via optical recognition, magnetic recognition or any other type of non contact indication method known in the art.

Figure 4:
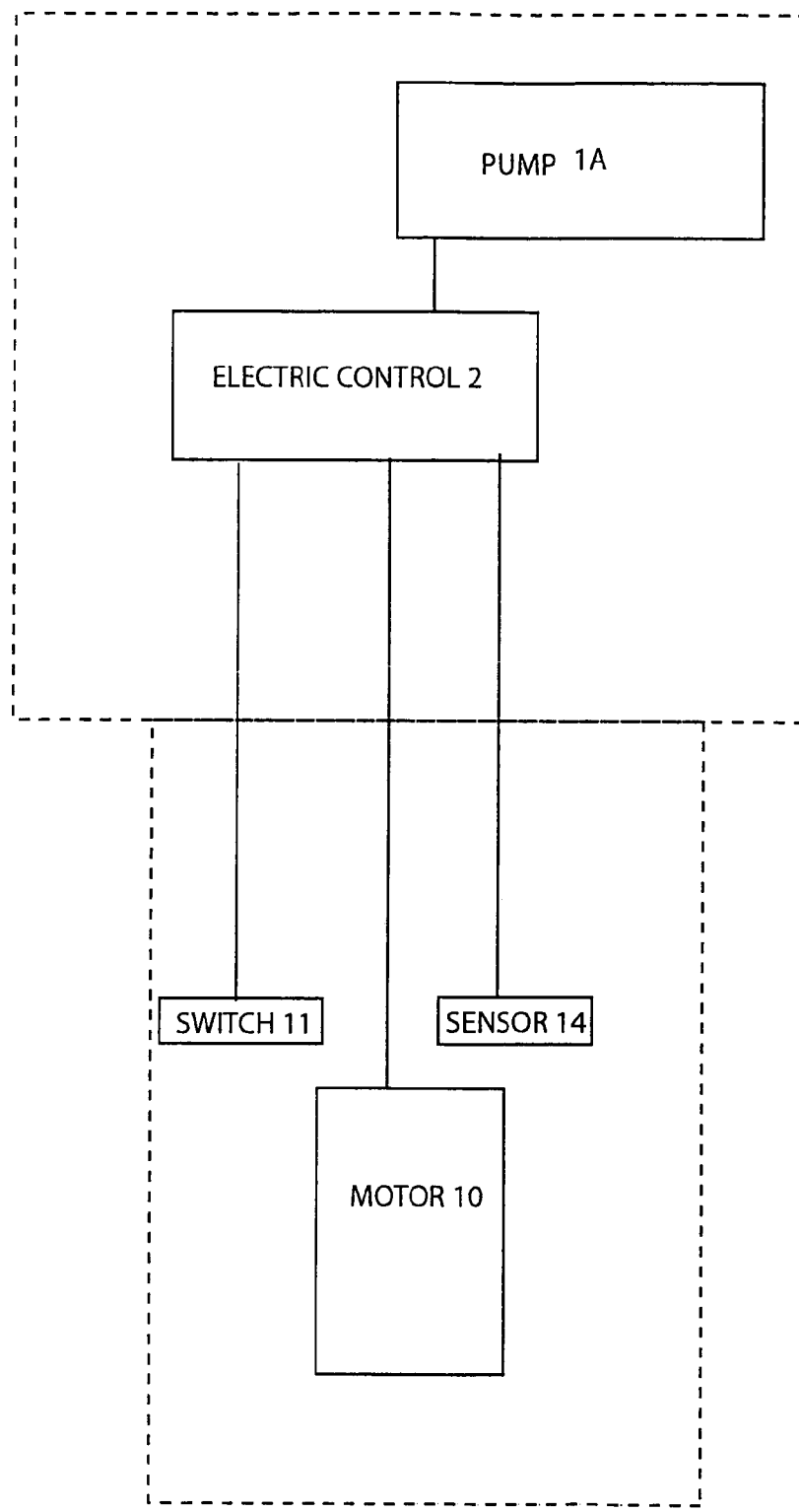
FIG. 4 is a block diagram of the electronic components in the invention.

FIG. 4 is a block diagram of the electronic components in the invention. This diagram shows the communication between a pump 1a, for pumping lubricant, electronic control 2, motor 10, switch 11, and sensor 14. Pump 1a, switch 11, sensor 14 and motor 10 are all in communication with electric control 2 so that electric control 2 can control pump 1a and motor 10 separately, and electric control 2 can receive signals from switch 11 and/or sensor 14 to control movement of motor 10 which controls the rotation of distributor 5 for precise distribution of lubricant. Thus, with this design, containing a separately controlled motor and pump a precise distribution of lubrication is possible.

Accordingly, while at least one embodiment of the present invention have been shown and described, it is to be understood that many changes and modifications may be made thereunto without departing from the spirit and scope of the invention as defined in the appended claims.

What is claimed is:

1. A device for supplying several lubrication points on machine parts with lubricant comprising:
   a) an electromechanical lubricant dispenser for housing lubricant;
   b) an electrical control disposed in said dispenser;
   c) a distribution device connected at a lubricant outlet of said lubricant dispenser said distribution device comprising:
      i) a housing;
      ii) a cylindrical hollow distributor body mounted to rotate about a vertical axis (A) and having an opening in a top region to receive the lubricant, at least two distributor bores disposed on its circumference, offset axially from one another;
      iii) a fixed cylindrical distributor sleeve that surrounds said distributor body forming a seal, wherein and said fixed cylindrical distributor sleeve has at least one opening bore that corresponds to each of said distributor bores, wherein each distributor bore has a release angle position of said distributor body assigned to it in which each distributor bore can be aligned with an associated opening bore assigned to it and can uncover said opening bore to allow said lubricant to be discharged from said distributor body and through said distributor sleeve;
   d) at least one electric motor drive disposed in said housing of said distribution device and coupled to said distributor body to rotate said distributor body, and in communication with and controlled by said electronic control; and
   e) at least one switch disposed in said housing and in communication with said electric control and serving as a running path control for starting or stopping the rotational movement of said motor and said distributor body moving to different release angle positions.

2. The device as in claim 1, further comprising a plurality of position pins that are releaseably attached to said distributor body and which are assigned to different release angle positions as switch elements to interact with said switch.

3. The device as in claim 1, wherein said electronic control predetermines an amount for lubricant dispensing and wherein said electronic control is in communication with said electric motor drive and sends a control impulse to said electric motor drive to trigger a rotational movement of said distributor body after said lubricant amount has been dispensed but before said lubricant dispenser receives a new dispensing pulse from said electronic control.

4. The device as in claim 1, wherein said distribution device further comprises a sensor for recognizing release angle position, wherein said sensor produces different signals assigned to each different release angle position.

5. The device as in claim 1, wherein said distributor body further comprises an indicator, which defines a reference value for an angle of rotation and wherein said sensor detects said indicator so that said sensor can then send a signal back to said electronic control.

6. The device as in claim 5, wherein said electric motor drive further comprises a sensor for detecting an angle of rotation that refers back to said indicator reference value, wherein said electric motor drive sensor sends measurement values back to said electronic control to indicate the angle of rotation.

7. A device for supplying several lubrication points on machine parts with lubricant comprising:
   a) an electromechanical lubricant dispenser for housing lubricant;
   b) an electrical control disposed in said dispenser;
   c) a distribution device connected at a lubricant outlet of said lubricant dispenser said distribution device comprising:
      i) a housing;
      ii) a cylindrical hollow distributor body mounted to rotate about a vertical axis (A) and having an opening in a top region, at least two distributor bores disposed on its circumference, offset axially from one another;
      iii) a fixed cylindrical distributor sleeve that surrounds said distributor body forming a seal, wherein and said fixed cylindrical distributor sleeve has at least one opening bore that corresponds to each of said distributor bores in said cylindrical hollow distributor body, wherein each distributor bore has a release angle position of said distributor body assigned to it in which each distributor bore is aligned with an associated opening bore assigned to it and uncovers said opening bore to allow said lubricant to be discharged from said distributor body and through said distributor sleeve;
   d) at least one electric motor drive disposed in said housing of said distribution device, and in communication with said electronic control;
   e) at least one switch disposed in said housing and in communication with said electric control serving as a running path control for starting or stopping the rotational movement of said electric motor and thus said distributor body moving to different release angle positions; and
   f) at least one pump disposed in said dispenser wherein said pump is in communication with said electric control and is operated separately from said motor, wherein said pump pumps said lubricant out of said distributor body and out of said distributor sleeve to lubricate the machine parts.

* * * * *